(12) United States Patent
Dalmas et al.

(10) Patent No.: US 9,545,954 B2
(45) Date of Patent: Jan. 17, 2017

(54) INSTRUMENT PANEL FRAME TO BE FIXED TO THE BODY-IN-WHITE OF A CAB, CAB INCLUDING SUCH AN INSTRUMENT PANEL FRAME AND METHOD FOR ASSEMBLING SUCH A CAB

(71) Applicant: VOLVO TRUCK CORPORATION, Göteborg (SE)

(72) Inventors: Patrick Dalmas, Valencin (FR); Geoffrey M. Horn, Greensboro, NC (US); Gladys Guillet, Villeurbanne (FR)

(73) Assignee: Volvo Truck Corporation, Göteborg (SE)

( * ) Notice: Subject to any disclaimer, the term of this patent is extended or adjusted under 35 U.S.C. 154(b) by 82 days.

(21) Appl. No.: 14/647,208

(22) PCT Filed: Nov. 30, 2012

(86) PCT No.: PCT/IB2012/003008
§ 371 (c)(1),
(2) Date: May 26, 2015

(87) PCT Pub. No.: WO2014/083377
PCT Pub. Date: Jun. 5, 2014

(65) Prior Publication Data
US 2015/0307136 A1 Oct. 29, 2015

(51) Int. Cl.
*B62D 25/14* (2006.01)
*B62D 65/02* (2006.01)
(Continued)

(52) U.S. Cl.
CPC ............. *B62D 25/145* (2013.01); *B62D 27/02* (2013.01); *B62D 33/06* (2013.01); *B62D 65/02* (2013.01)

(58) Field of Classification Search
CPC ..... B62D 25/081; B62D 25/14; B62D 25/145; B62D 25/147; B62D 33/06; B62D 65/02; B62D 65/04; B62D 65/14; G05G 1/36
(Continued)

(56) References Cited

U.S. PATENT DOCUMENTS

| 4,353,430 A | 10/1982 | Sjoqvist et al. |
| 2009/0200835 A1* | 8/2009 | Nilsson ................ B62D 25/145 296/190.08 |

FOREIGN PATENT DOCUMENTS

| DE | 30 01 274 A1 | 7/1980 |
| DE | 195 24 165 A1 | 8/1996 |

(Continued)

OTHER PUBLICATIONS

International Search Report (Jun. 18, 2013) for corresponding International App. PCT/IB2012/003008.

*Primary Examiner* — Jason S Daniels
(74) *Attorney, Agent, or Firm* — WRB-IP LLP

(57) ABSTRACT

An instrument panel frame includes two supporting members and a linking member. Each supporting member is suitable for supporting at least one subset of an industrial vehicle. Each supporting member is attached to the linking member. Each supporting member has a fixing interface designed to cooperate with a respective fixing area of the firewall structure. These respective fixing areas surround some major openings of the firewall structure. The supporting members and the linking member are arranged so that each fixing interface cooperates with a respective fixing area, so as to enable the fixing of the instrument panel frame to the firewall structure.

20 Claims, 5 Drawing Sheets

(51) Int. Cl.
  *B62D 33/06* (2006.01)
  *B62D 27/02* (2006.01)
(58) Field of Classification Search
  USPC .............................. 296/70, 72, 190.08, 192
  See application file for complete search history.

(56) References Cited

FOREIGN PATENT DOCUMENTS

| | | |
|---|---|---|
| EP | 0 736 445 A1 | 10/1996 |
| FR | 2 790 116 A2 | 8/2000 |
| WO | 2005061314 A1 | 7/2005 |
| WO | 2007111543 A1 | 10/2007 |

\* cited by examiner

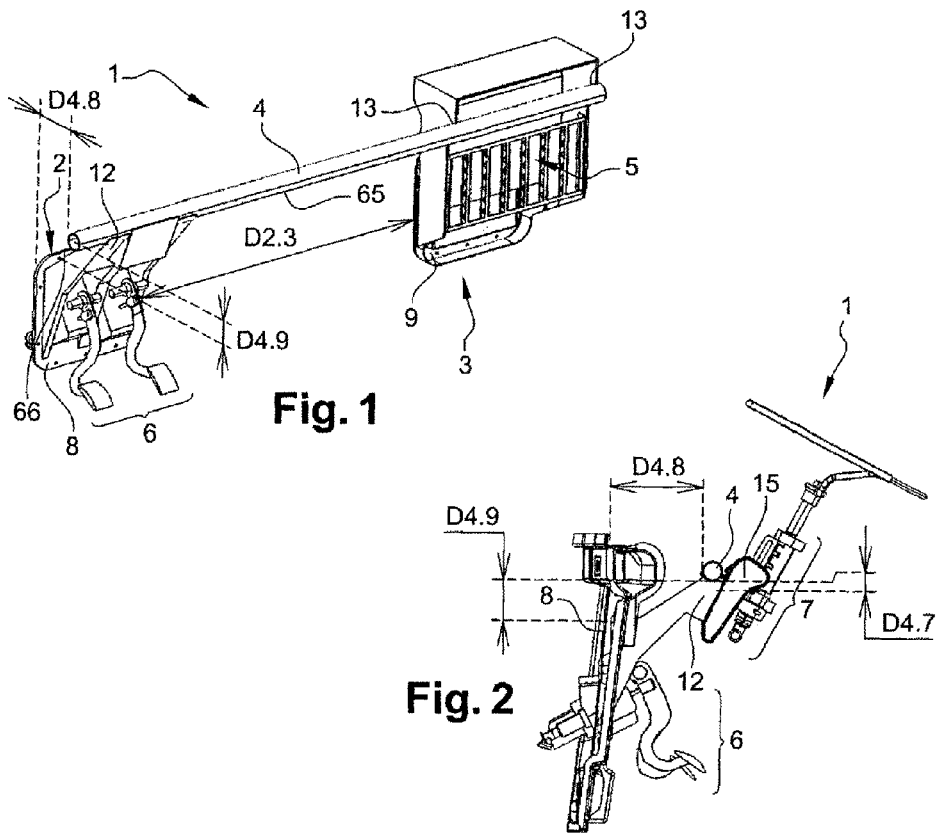
Fig. 1
Fig. 2
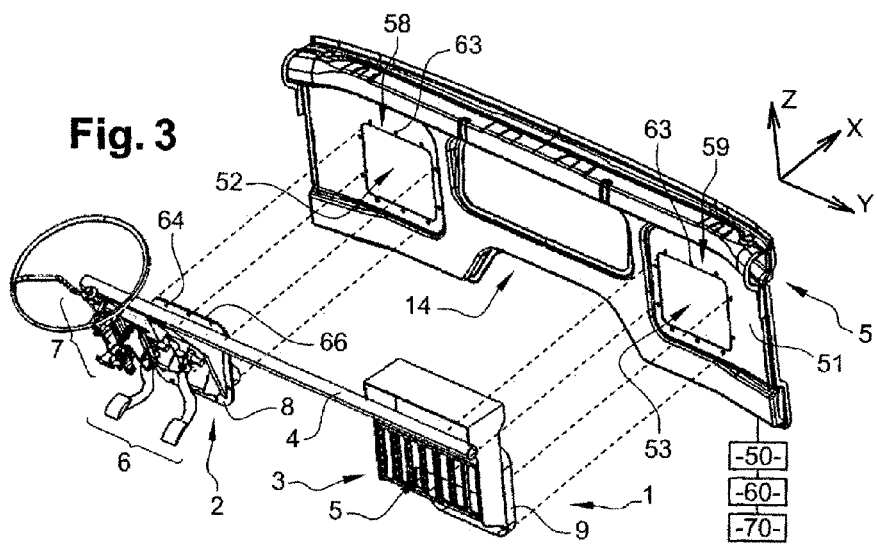
Fig. 3

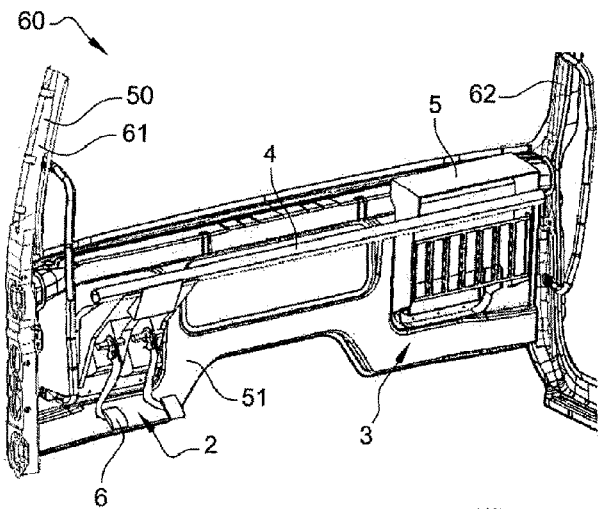
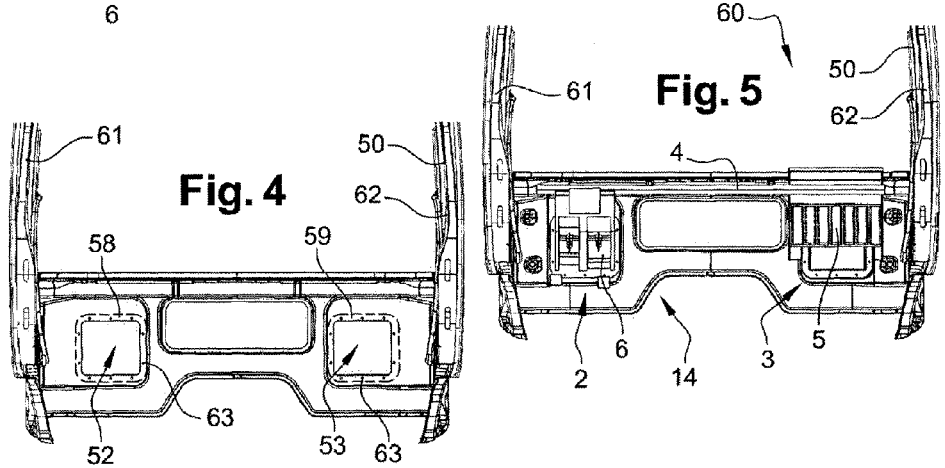
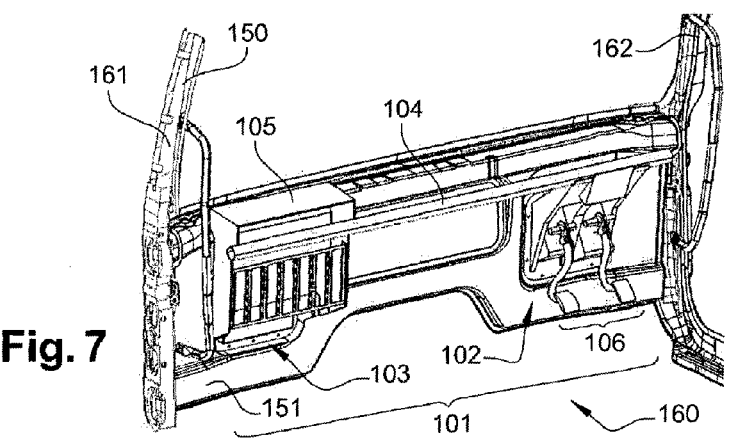

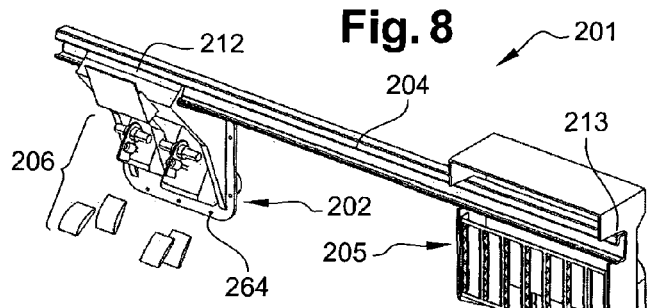
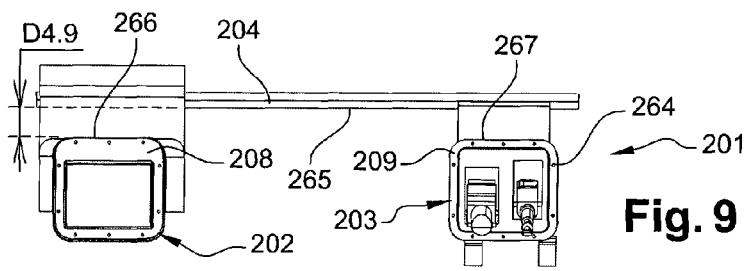
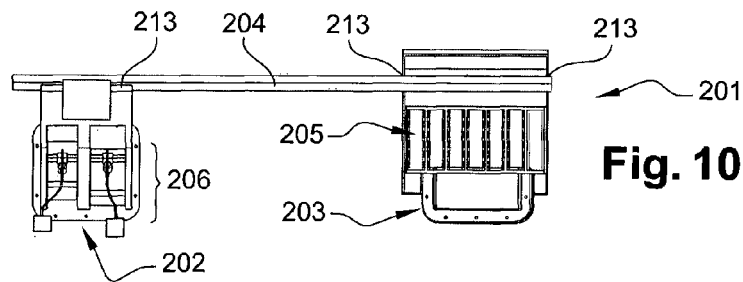
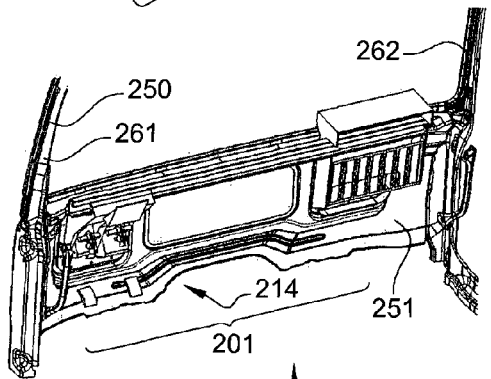
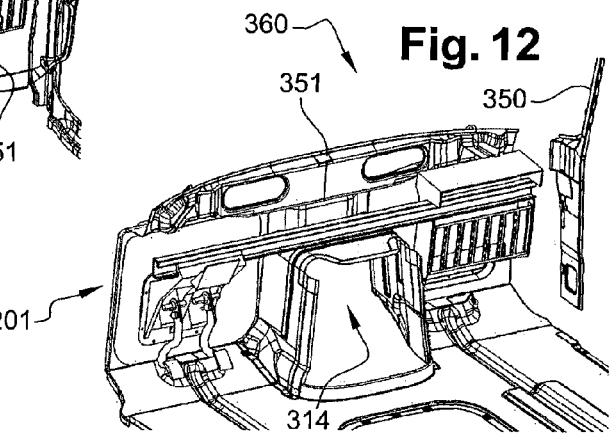

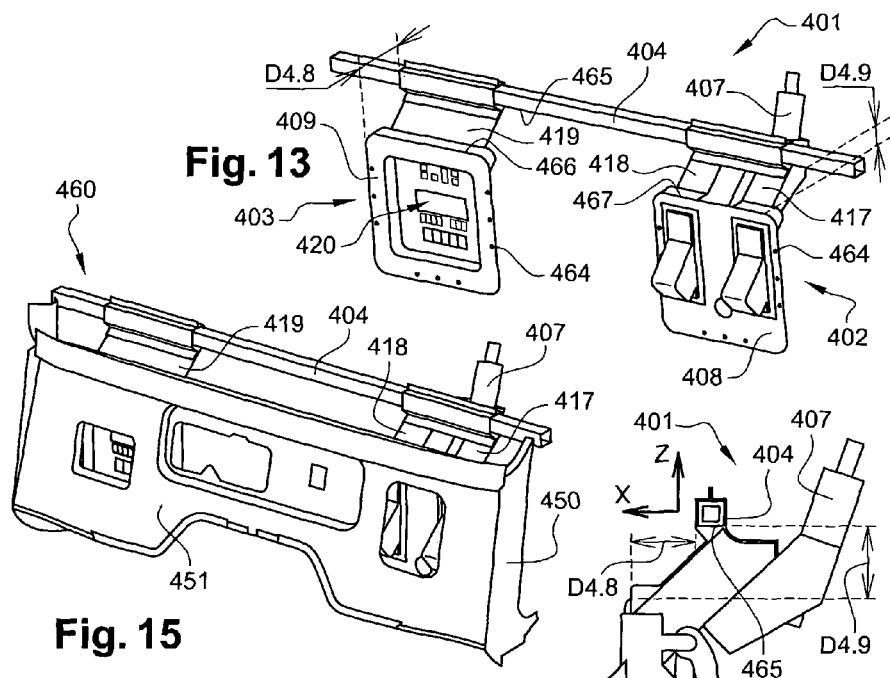
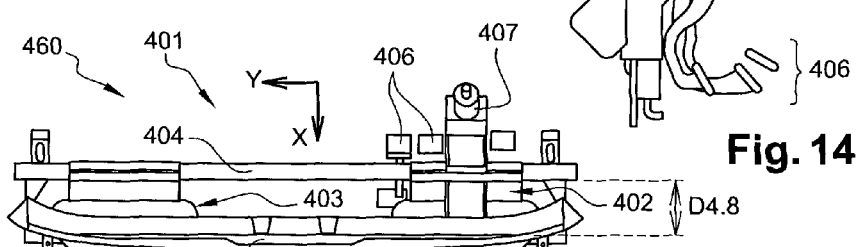
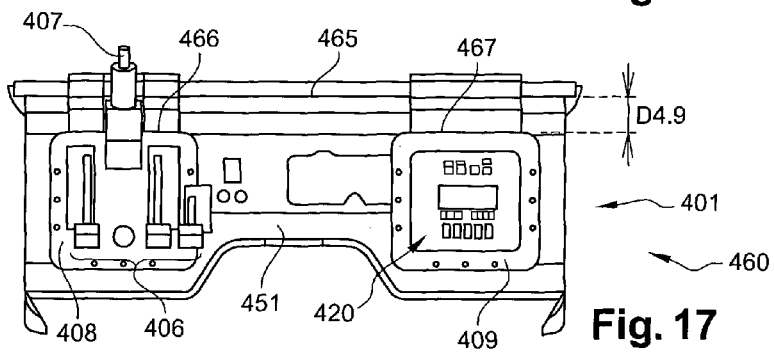

INSTRUMENT PANEL FRAME TO BE FIXED TO THE BODY-IN-WHITE OF A CAB, CAB INCLUDING SUCH AN INSTRUMENT PANEL FRAME AND METHOD FOR ASSEMBLING SUCH A CAB

BACKGROUND AND SUMMARY

The present invention relates to an instrument panel frame suitable for being fixed to the body-in-white of a motor vehicle cab. Besides, the present invention relates to a cab for a motor vehicle, which includes such an instrument panel frame. Furthermore, the present invention relates to a method for assembling such a cab.

U.S. Pat. No. 4,353,430A discloses a cab, for an industrial vehicle, which comprises a body-in-white including a firewall structure, for defining a lower forward portion of the cab. The firewall structure of U.S. Pat. No. 4,353,430A has two major openings. The cab of U.S. Pat. No. 4,353,430A includes a pedal panel which is attached to the cab body-in-white. This pedal panel includes a support plate for supporting the pedals subset of the industrial vehicle. The support plate is fixed directly to the cab body-in-white.

Yet, the cab design of U.S. Pat. No. 4,353,430A strongly depends on the cab specifications, in particular on the geometry of the pedal panel and of the body-in-white. Hence, the cab design of U.S. Pat. No. 4,353,430A hampers the adaptation of the pedal panel and of the different related subsets to other cab specifications.

Besides, the cab design of U.S. Pat. No. 4,353,430A induces a long, difficult process for assembling the components of the cab. Indeed, several subsets have to be positioned and fixed individually to the cab body-in-white. Such subsets include for instance the instrument panel subset, the electrical board subset, the electronic control units (ECU) subset, the subset for heating, ventilating and air-conditioning (HVAC), the dashboard subset, the steering column, the airbag subset etc.

It therefore appears that, from several standpoints, there is a room for improvement in the instrument panel frames of industrial vehicle.

It is desirable to provide an instrument panel frame which can be adapted to many different cab specifications, without changing the design of other components of the cab.

It is also desirable to provide an instrument panel frame that facilitates and shortens the assembling process of the panels and of the subsets they support.

A subject-matter of an aspect of the invention is an instrument panel frame, suitable for being fixed to the body-in-white of a cab of an industrial vehicle, the body-in-white including a firewall structure for defining a lower forward portion of the cab, the firewall structure having at least two major openings, the instrument panel frame including at least two supporting members and a linking member, each supporting member being suitable for supporting least one subset of the industrial vehicle, wherein:

each supporting member is attached to the linking member; each supporting member has a fixing interface designed to cooperate with a respective fixing area of the firewall structure, said respective fixing area surrounding at least partly a respective one of said major openings; and the supporting members and the linking member are arranged so that each fixing interface cooperates with a respective fixing area, so as to enable the fixing, of the panel frame to the firewall structure.

Throughout this patent application, the term "industrial vehicle" refers to a vehicle suitable for transporting heavy loads or goods, for instance a truck hauling a trailer, a semi-trailer or a delivery van.

The "body-in-white" of cab is also known as the raw bodywork of the cab.

The "firewall structure" is also known as a front panel also known as an interface panel of the body-in-white. The firewall structure is arranged at the front of the body-in-white of the cab. When the cab is mounted onto the vehicle chassis frame and when the wheels of the industrial vehicle lie on a horizontal plane, the firewall structure is oriented in a substantially vertical direction.

The term "major opening" refers to an opening formed in the firewall structure and having a circular, a rectangular, trapezoidal shape or any other shape. A major opening is big enough to allow the passage of at least wire harness through the firewall structure. Basically, the shape of such a major opening is sized so that the smallest dimension (diameter, width . . . ) of the opening is greater than 150 mm and preferably greater than 300 mm.

Thus, such an instrument panel frame enables adaptation of its design to many different cab specifications, which avoids changing the design of other components of the cab. The cab specifications include for instance cab width, cab height, right- or left-hand driving, type of subsets borne by the instrument panel frame. Indeed, the arrangement of the supporting members can be adapted simply by changing their positions with respect to the linking member.

Besides, such an instrument panel frame enables a quicker and easier assembly of the instrument panel frame and of the subset(s) it supports, before fixing onto the body-in-white of the cab. Indeed, the linking member makes it possible to set, outside of the cab, the correct positions of the supporting members and of the subsets they support. Since the supporting members fixe the instrument panel frame to the body-in-white, the linking member does not need to be fixed to the body-in-white, say to the front side pillars.

Throughout this patent application, the term "subset" refers to a group of components or parts, which performs a specific function for the cab or for the industrial vehicle.

Throughout this patent application, the term "attached" means that two parts are attached either directly or indirectly. In other words, these two pans are attached to one another via zero (directly), one or more (indirectly) intermediate part(s).

In an embodiment, each supporting member is suitable for supporting at least one subset of the industrial vehicle, the subsets of the industrial vehicle being preferably selected among a steering column unit, a control pedals unit, a heating, ventilating and air-conditioning unit (HVAC), an electric control unit (ECU) or an airbag unit, Thus, the supporting members may support at least two subsets of the industrial vehicle. It enables a quick and easy assembly of the instrument panel frame and of the subsets it supports, before fixing onto the body-in-white of the cab. Alternatively one support member may support at least one subset of the industrial vehicle whereas the other supporting member doesn't support any subset. In other words, the supporting members may support only one subset of the industrial vehicle.

In another embodiment, each fixing interface is designed to totally surround a respective one of said major openings, each fixing interface being preferably designed to fit on the periphery of a respective one of said major openings.

Thus, each fixing interface provides a firm fixing of the instrument panel frame on the firewall structure, which enables the instrument panel frame to support quite heavy subsets of the industrial vehicle.

In a further embodiment, the instrument panel frame includes adjustable fasteners for attaching each supporting member to the linking member with an adjustable distance between the supporting members.

Thus, such adjustable fasteners enhance the adaptability of the instrument panel frame to different cab designs.

In another embodiment, the linking member includes a profiled beam, preferably having a hollow section, and wherein the adjustable fasteners are designed to slide along the profiled beam.

Thus, such a profiled beam and adjustable fasteners enable the adjustment of the distance between the supporting members, which enhances the adaptability and quick assembling of the instrument panel frame.

The profiled beam extends along its entire length preferably in straight lines. In a variant, the profiled beam can also be curved. For instance, the profiled beam can be curved in the central portion whereas the end portions where are attached the supporting members can still extend in straight lines. The central portion can also be in straight lines but offset with respect to the the portions where are attached the supporting member.

In an embodiment, the linking member, preferably its central portion, is designed to support at least one subset of the industrial vehicle.

Thus, the instrument panel frame can support several subsets, say three, one for the linking, member and one for each supporting member.

In another embodiment, the fixing interfaces have similar shapes so that the supporting members can be interchanged relative to the major openings.

Thus, the possibility to interchange the supporting members enhances the adaptability of the instrument panel frame design to many different cabs. Indeed, each supporting member can be mounted on the body-in-white either on the left side or on the right side, irrespective of the subset it supports.

In a further embodiment, each fixing interface has a rectangular shape.

Thus, such fixing interfaces enable a strong fixing of the instrument panel frame to the firewall structure.

In another embodiment, the supporting members and the linking member are arranged so that the linking member is offset upwards from each fixing interface when the instrument panel frame is fixed to the firewall structure.

To be more precise it is the lower edge of the linking member that is offset upwards from the upper edge of each supporting member. Preferably, the upwards offset distance between the lower edge of the linking member and the upper edge of each supporting member lies in the range from 50 mm to 200 mm, and more preferably in the range from 75 to 10 mm.

Throughout this patent application, the terms "upwards", "lower" and "upper" refer to a direction that is substantially vertical from the bottom-up when the instrument panel frame is fixed to the firewall, when the cab is mounted on the vehicle chassis frame and when the wheels of the industrial vehicle lie on a horizontal plane.

Thanks to the upwards offset and in particular thanks to the minimum value of the upwards offset distance (50 mm and preferably 75 mm), the linking member doesn't interfere with the steering column that extends inside the cab. In addition and when the cab has a doghouse recess (United States conventional trucks) or an engine tunnel, this upwards offset allows the linking member to not interfere with the doghouse recess nor with the engine tunnel.

When the upwards offset distance is below the maximum value (200 mm and preferably 110 mm), the linking member may be located very close to the steering column so that the overall compactness of the instrument panel frame and the integration of the instrument panel frame inside the cab are increased.

Besides, such an arrangement of the linking member enhances the adaptability of the instrument panel frame design to many different cabs, in particular to cabs having a doghouse recess (United States conventional trucks).

In yet another embodiment, the supporting members and the linking member are arranged so that the linking member is offset rearwards from each fixing interface when the instrument panel frame is fixed to the firewall structure.

Thus, such an offset arrangement of the linking member enhances the adaptability of the instrument panel frame design to many different cabs, in particular to cabs having a curved windshield frame. Indeed, where the linking member extends more towards the inside of the cab than each fixing interface, the instrument panel frame, in particular the linking member, will not interfere with the windshield frame or with the windshield.

Throughout this patent application, the term "rearwards" refers to a longitudinal direction that corresponds to the rearward moving direction of the industrial vehicle. When the instrument panel frame is fixed to the firewall and into the cab, the term "rearwards" corresponds to a direction that extends from the firewall towards the inside of the cab.

In a particular embodiment, a rearwards offset distance between the linking member and each fixing interface lies in the range from 100 mm to 600 mm, preferably in the range from 100 mm to 350 mm.

Thus, such a rearwards offset distance is adapted to most of the cab dimensions and thanks to that, it is avoided interferences between the instrument panel frame, especially the link member, and the windshield frame or the windshield. The preferred range from 100 mm to 350 mm allows a better overall compactness and integration of the instrument panel frame inside the cab.

In another embodiment, a wire harness extends along and inside the linking member.

Thus, the linking member also achieves the function of guiding and protecting the wire harness.

In a further embodiment, the instrument panel frame further includes at least two attaching arms respectively located between the linking member and each supporting member, each attaching arm being arranged to attach a respective supporting member to the linking member, each attaching arm being integral either with a respective supporting member or with the linking member.

Thus, such attaching arms enhance the adaptability of the instrument panel frame design, because changing the form and length of these attaching arms suffices to compensate for any change in the cab dimensions, while keeping the same fixing interfaces on the supporting members.

According to some other variants:
   The supporting members and the linking member can be made either of metal or of plastics.
   The supporting members can be attached to the linking member by clipping, by flanges, by welding, by shrinking or heat-shrinking or by any equivalent means.
   The supporting member is a metallic plate or is made of drawn metal sheet
   The linking member can have elastic properties.
   The instrument panel frame can also include vibration dampeners affixed to the linking member, for instance on its side ends. The dashboard panel could be fastened to these vibration dampeners.

The invention also relates, according to an aspect thereof, to a cab for an industrial vehicle, comprising a body-in-white including a firewall structure for defining a lower forward portion of the cab, the firewall structure having at least two major openings, wherein the cab further includes an instrument panel frame, the instrument panel frame being fixed to the firewall structure.

Thus, such a cab can be assembled quickly.

According to advantageous but optional features, considered on their own or in any technically feasible combination:

The supporting members and the linking member are arranged so that the linking member is offset from each supporting member according to a direction that extends from the floor towards the inside of the cab and that is substantially perpendicular to the floor of the cab. The floor of the cab is substantially a horizontal surface when the cab is mounted onto the vehicle chassis frame and when the wheels of the industrial vehicle lie on a horizontal plane.

The offset distance, between the linking member and each supporting member lies in the range from 50 mm to 200 mm, preferably in the range from 75 mm to 110 mm according to the direction that is substantially perpendicular to the floor of the cab. In other words, when the cab is mounted onto the vehicle chassis frame and when the wheels of the industrial vehicle lie on a horizontal plane, this offset distance can be measured in a substantial vertical direction between the lower edge of the linking member and the upper edge of each supporting member.

The supporting members and the linking member are arranged so that the linking member is offset from each fixing interface according to a direction that extends from the firewall structure towards the inside of the cab and that is substantially perpendicular to the firewall structure.

The offset distance, between the linking member and each fixing interface, lies in the range from 100 mm to 600 mm, preferably in the range from 100 mm to 350 mm according to the direction that is substantially perpendicular to the firewall structure. In other words, when the cab is mounted onto the vehicle chassis frame and when the wheels of the industrial vehicle lie on a horizontal plane, this offset distance can be measured in a substantial horizontal direction between the linking member and each fixing interface.

Besides, an aspect of the invention relates to a method for assembling, the method including the steps of:

a) suspending onto a temporary structure at least two supporting members, preferably equipped with at least one subset of the industrial vehicle;

b) attaching the linking member to the supporting members, so as to form said instrument panel frame;

c) fastening components to the instrument panel frame, like dashboard components and dashboard panel;

d) removing the instrument panel frame, equipped with said components, from the temporary structure;

e) arranging said supporting members and the linking member so that each one of said fixing interface cooperates with a respective fixing area; and f) fixing the instrument panel frame to said firewall structure of said body-in-white.

Thus, such a method enables a quick and easy assembly of the cab.

These and other features and advantages will become apparent upon reading the following description in view of the drawings appended thereto, which represent, as non-limiting examples, embodiments of an exhaust device according to the invention.

BRIEF DESCRIPTION OF THE DRAWINGS

The following detailed description of several embodiments of the invention is better understood when read in conjunction with the appended drawings. However, the invention is not limited to the specific embodiments disclosed herewith.

FIG. 1 is a rear perspective view of an instrument panel frame according to a first embodiment of the invention;

FIG. 2 is a left side view of the instrument panel frame of FIG. 1;

FIG. 3 is a perspective view, from the inside of the cab, of a lower forward portion of a cab according to the first embodiment of the invention and including the instrument panel frame of FIG. 1, in a position before fixing the instrument panel, frame to the body-in-white;

FIG. 4 is a view, from the inside of the cab, of the body-in-white in a position before fixing the instrument panel frame to the body-in-white;

FIG. 5 is a perspective view, from the inside of the cab, of the portion of the cab of FIG. 3, after having fixed the instrument panel frame to the body-in-white;

FIG. 6 is a view, from the inside of the cab, of the portion of the cab in the position of FIG. 5;

FIG. 7 is a view similar to FIG. 6, of a cab according to a second embodiment of the invention;

FIG. 8 is a rear perspective view of an instrument panel frame according to a third embodiment of the invention;

FIG. 9 is a rear view of the instrument panel frame of FIG. 8;

FIG. 10 is a front view of the instrument panel frame of FIG. 8;

FIG. 11 is a view similar to FIG. 6 of a lower forward portion of a cab according to the third embodiment of the invention and including the instrument panel frame of FIG. 8, in a position after fixing the instrument panel frame to the body-in-white;

FIG. 12 is a view similar to FIG. 7, of a cab according to a fourth embodiment of the invention;

FIG. 13 is a view similar to FIG. 8 of an instrument panel frame according to a fifth embodiment of the invention;

FIG. 14 is a view similar to FIG. 2 of the instrument panel frame of FIG. 13;

FIG. 15 is a front perspective view of a lower forward portion of a cab according to the fifth embodiment of the invention, after fixing the instrument panel frame to the body-in-white;

FIG. 16 is a top view of the lower forward portion of the cab of FIG. 15;

FIG. 17 is a view, from the inside of the cab, of the lower forward portion of the cab of FIG. 15.

DETAILED DESCRIPTION

Figure 18:
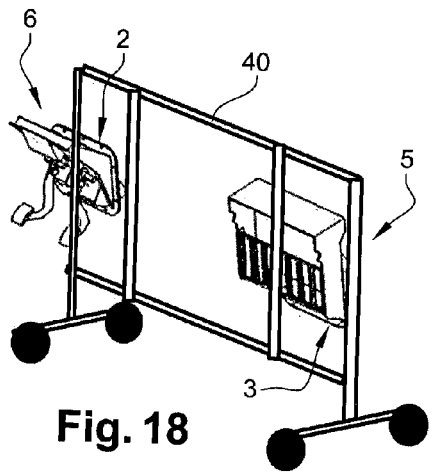
FIGS. 18 to 22 are perspective views of the instrument panel frame and the cab of FIGS. 1 to 6 illustrating an assembling method according to the invention.

FIGS. 1, 2, 3, 4, 5 and 5 illustrate an instrument panel frame 1, which is suitable for being fixed to the body-in-white 50 of a cab 60 of an industrial vehicle 70. The body-in-white 50 includes a firewall structure 51 for defining a lower forward portion of the cab 60. The firewall structure 51 has two major openings 52 and 53. The firewall structure 51 has a generally a flat shape oriented globally in a vertical direction when the cab 60 is mounted onto the vehicle chassis frame and when the wheels of the industrial vehicle 70 lie on a horizontal plane.

The firewall structure 51 may for instance be made from one or more drawn metal sheet.

The instrument panel frame 1 includes two supporting members 2 and 3 and a linking member 4. Each supporting member 2 or 3 is attached to the linking member 4. In the example of FIGS. 1 to 6, both the supporting member 2 and the supporting member 3 are directly attached to the linking member 4.

Each supporting member 2 or 3 is suitable for supporting one or more subset(s) of the industrial vehicle 70. In the example of FIGS. 1 to 6, the subset supported by the supporting member 3 is a heating, ventilating and air-conditioning unit HVAC) 5, while the subsets supported by the supporting member 2 are a control pedals unit 6 (brakes and acceleration) and a steering column unit 7. It is noticed that different subsets can those mentioned can also be supported by the supporting member like for instance an electric control unit or an airbag unit. It is also possible that one supporting member 2, 3 doesn't support any subset.

Thus, the supporting members 2 and 3 enable a quick and easy assembly of the instrument panel frame 1 with the subsets it supports (HVAC 5, control pedals unit 6 and steering column unit 7), before fixing onto the body-in-white 50 of the cab 60.

Each supporting, member 2 or 3 includes a plate Which is substantially parallel to a main direction Y of the instrument panel frame 1 and which can be made of drawn metal sheet. Thus, supporting members 2 and 3 have a compact design. The main direction X of the instrument panel frame 1 is substantially perpendicular to the forward direction X of the industrial vehicle 70 when the instrument panel frame 1 is assembled onto the body-in-white 50.

Furthermore, each of the supporting members 2 and 3 has a fixing interface, respectively 8 and 9. These fixing interfaces 8 and 9 are designed to cooperate with two respective fixing areas 58 and 59 of the firewall structure 51. Fixing areas 58 and 59

In the example of FIGS. 1 to 6, fixing area 58 is designed to totally surround the major opening 52, while fixing area 59 is designed to totally surround the major opening 53. The fixing areas 58 and 59 extend on the periphery of a respective major opening 52 or 53. Thus, each fixing interface 8 or 9 provides a firm fixing of the instrument panel frame 1 on the firewall structure 51, which enables the instrument panel frame 1 to support quite heavy subsets 5, 6, 7 of the industrial vehicle 70.

As illustrated at FIGS. 1 and 3, fixing interface 8 and fixing area 58 have several through holes 63, 64, which have corresponding locations for the passage of bolts not shown. Likewise, fixing interface 9 and fixing area 59 have several through holes 63, 64, which have corresponding locations for the passage of bolts not shown. All these bolts enable fixing instrument panel frame 1 on firewall structure 51.

Alternatively, the instrument panel frame could be fixed on the firewall structure 51 by any means equivalent to bolts, like e.g. weldings, rivets, glued areas, clip fixing devices, etc.

The supporting members 2 and 3 and the linking member 4 are arranged so that each one of the fixing interfaces 8 and 9 cooperates with a respective fixing area 58 or 59, thus enabling the fixing of the instrument panel frame 1 to the firewall structure 51.

Such as represented in the example of FIGS. 1 to 6, each fixing interface 8 or 9 may have a flat, annular shape with a rectangular basis. Accordingly, each fixing area 58 or 59 has a flat, annular shape with a rectangular basis. Thus, the cooperation between the fixing interfaces 8 and 9 and the fixing areas 58 and 59 enable a firm, strong fixing of the instrument panel frame 1 to the firewall structure 51.

Such as represented in the example of FIGS. 1 to 6, the fixing interfaces 8 and 9 may have similar shapes so that the supporting members 2 and 3 can interchanged relative to the major openings 52 and 53. Thus, each supporting member 2 or 3 can be mounted on the body-in-white 50 either on the left side or on the right side, irrespective of the subset it supports.

According to a variant, the linking member 4 can be designed to support at least one subset of the industrial vehicle 70. In such a variant, the instrument panel frame 1 could support several subsets, say three, one for the linking member 4 and one for each one of the supporting members 2 and 3.

Besides, instrument panel frame 1 can include adjustable fasteners for attaching each supporting member 2 or 3 to the linking member 4 with an adjustable distance D2.3 between the supporting members 2 and 3. Thus, such adjustable fasteners enhance the adaptability of instrument panel frame 1 to different cab designs, since the distance D2.3 can be adjusted to the cab width.

Such represented in the example of FIGS. 1 to 6, the linking member 4 may include a profiled bean with a circular cross-section. Furthermore, this profiled beam has a hollow section. Thus, such a hollow profiled beam makes the linking member 4 pretty light.

The supporting member 2 may be attached to the linking member 4 by way of an adjustable fastener that can be comprised of flanges 12; the supporting member 3 is attached to the linking member 4 by way of an adjustable fastener that can also be comprised of flanges 13.

The shapes of flanges 12 and 13 are complementary to the shape of linking member 4.

Figure 19:
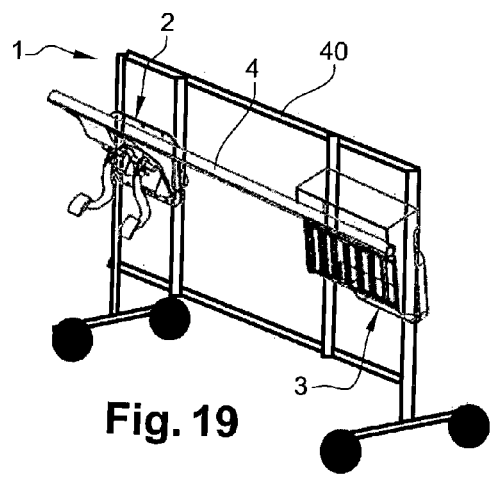
Figure 20:
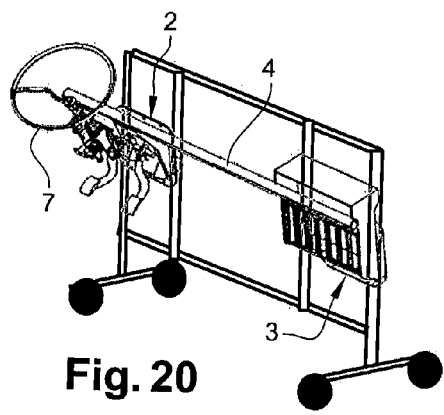
Figure 21:
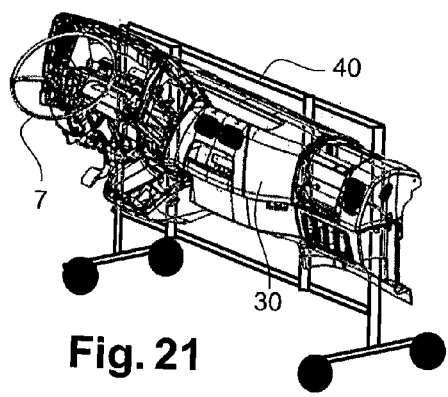
Figure 22:
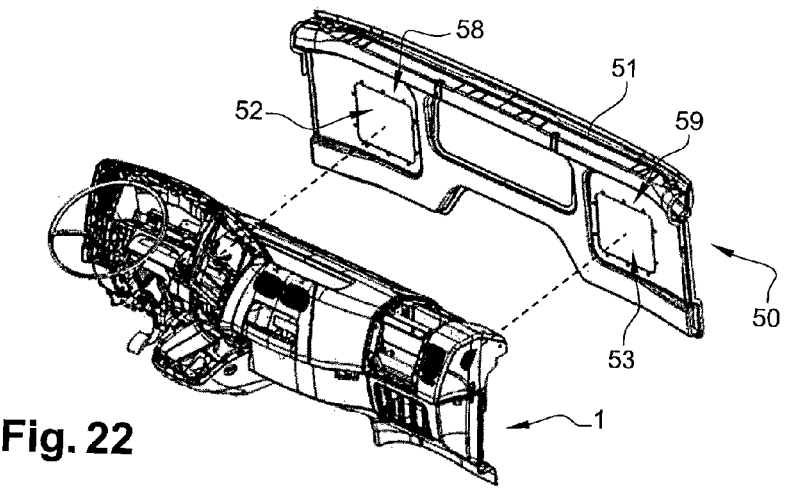

The adjustable fasteners, herein comprised of flanges 12 and 13, can be designed to slide along this profiled beam. In thus a case, the profiled beam and adjustable fasteners enable the adjustment of the distance D2.3 between the supporting members 2 and 3, which enhances the adaptability and quick assembling of the instrument panel frame 1, as hereafter described in relation with FIGS. 18 to 22.

Besides, the supporting members 2 and 3 and the linking member 4 are preferably arranged so that the linking member 4 is offset rearwards, i.e. opposite the forward direction X, from each fixing interface 8 or 9 when the instrument panel frame 1 is fixed to the firewall structure 51. Such an offset arrangement of the linking member 4 enhances the adaptability to cabs having a curved windshield frame.

In the examples of FIGS. 1 to 17, especially in the example of FIGS. 1to 6, a rearwards offset distance D4.8 between the linking member 4 and each fixing interface 8 or 9 is approximately 300 mm, which lies in the range from 100 mm to 600 mm an preferably in the range from 100 mm and 350 mm in order to increase the overall compactness and integration of the instrument panel frame 1 inside the cab 60 without causing interferences between the instrument panel frame 1 and the windshield frame. In the example of FIGS. 1 to 6 the upwards offset distance D4.8 is approximately 200 mm.

Moreover, the supporting members 2 and 3 and the linking member 4 are arranged so that the linking member 4 is offset upwards, along a Z direction, from each fixing interface 52 and 53 when the instrument panel frame 1 is fixed to the firewall structure 51. To be more precise, it is the lower edge 65 of the linking member 4 that is offset upwards from the upper edge 66, 67 of each supporting member 2, 3. In a particular embodiment, the upwards offset distance D4.9 between the lower edge 65 of the linking member and the upper edge 66, 67 of each supporting member 2, 3 lies in the range from 50 mm to 200 mm, preferably in the range from 75 to 110 mm. In the example of FIGS. 1 to 6 the upwards offset distance D4.9 is approximately 105 mm.

Are previously described, the fixing interfaces 8 and 9 may have similar shapes. In this case the upper edges 66, 67 of the supporting members are at the same height and therefore at the same upwards offset distance D4.9 from the linking member 4.

Thanks to this upwards offset distance, the linking member 4 can be arranged very close to the steering column unit 7 without interfering with it.

Thanks to this, an upwards offset distance D4.7 between the linking member 4 and the steering column unit 7, more precisely between the linking member 4 and the intermediate support 15 of the steering column unit 7, can be very limited. The upwards offset distance D4.7 can, for instance, lie in the range from 25 mm to 50 mm. Such a small upwards offset distance D4.7 increases the overall compactness of the cab components.

Besides, a wire harness may extend along and inside the linking member 4, which thus guides and protects the wire harness.

Referring to FIGS. 4, 5 and 6, FIG. 4 illustrate the body-in-white 50 of the cab 60 without instrument panel flame 1. FIGS. 5 and 6 illustrate the cab 60 for the industrial vehicle 70 comprises the body-in-white 50 which in turn includes a firewall structure 51 for defining a lower forward portion of the cab 60. The firewall structure 51 has the two major openings 52 and 53 respectively surrounded by the fixing areas 58 and 59.

FIGS. 4, 5 and 6 further illustrate two front side pillars or A-pillars 61, 62 of cab 60. The front side pillars 61, 62 extend generally vertically and they are located on the front and on a respective side of the cab 60, between the location of the door hinges and of the windshield.

After fixing, of the instrument panel frame 1 to the firewall structure 51, the cab 60 further includes the instrument panel frame 1. Cab 60 can be assembled quickly, as hereafter described in relation to FIGS. 18 to 22.

FIG. 7 illustrates a cab 160 and an instrument panel frame 101 according to a second embodiment of the invention. The description of cab 60 and instrument panel frame 1 given above with reference to FIGS. 1 to 6 can be transposed to cab 160 and instrument panel frame 101, which are similar thereto, with the noticeable exception of the hereafter stated difference(s).

An element of cab 160 or an element of instrument panel frame 101 that has a structure or function similar or corresponding to that of an element of cab 60 and an instrument panel frame 1 is allotted the same reference numeral plus 100. One can thus define supporting members 102 and 103, linking member 104, subsets like a heating, ventilating and air-conditioning unit (HVAC) 105 and a control pedals unit 106, plus a body-in-white 150 with a firewall structure 151.

Cab 160 differs from cab 60, because cab 60 has a left-hand driving design instead of a right-hand driving design. Accordingly, the instrument panel frame 101 hence differs from instrument panel frame 1, because its supporting members 102 and 103 have interchanged sides. Consequently, the supported subsets have interchanged sides. Hence, the control pedals unit 106 and the steering column unit are located on the left side of cab 160, whereas the heating, ventilating and air-conditioning unit (HVAC) 105 is located on the right side of cab 160.

FIGS. 8, 9, 10 and 11 illustrate a cab 260 and an instrument panel frame 201 according to a third embodiment of the invention. The description of cab 60 and instrument panel frame 1 given above with reference to FIGS. 1 to 6 can be transposed to cab 260 and instrument panel frame 201, which are similar thereto, with the noticeable exception of the hereafter stated difference(s).

An element of cab 260 or an element of instrument panel, frame 201 that has a structure or function similar or corresponding to that of an element of cab 60 and an instrument panel frame 1 is allotted the same reference numeral plus 200. One can thus define supporting members 202 and 203, linking member 204, subsets like a heating, ventilating and air-conditioning unit (HVAC) 205, a control pedals unit 206, fixing interfaces 208 and 209, flanges 212 and 213, plus a firewall structure 251.

Instrument panel frame 201 differs from instrument panel frame 1, because linking member 204 has a partly rectangular cross-section. The cross-section of linking member 204 has the general shape of a "G". Accordingly, the flanges 212 and 213 have partly rectangular shapes. Such shapes for instance enable an easy introduction of a wire harness within the hollow linking member 204.

As illustrated on FIG. 11, the instrument panel frame 201 can be assembled to a body-in-white 250 having a firewall structure 251 with an engine tunnel 214, thus forming cab 260. Alternatively, as illustrated on FIG. 12, instrument panel frame 201 can be assembled to a body-in-white 350 having a firewall structure 351 with a doghouse recess 314, thus forming a cab 360 according to a fourth embodiment of the invention. The comparison between FIGS. 11 and 12 enlightens the adaptability of an instrument panel frame according to the invention, since it can be assembled to very different cab body-in-whites.

FIGS. 13, 14, 15, 16 and 17 illustrate a cab 460 and an instrument panel frame 401 according to a fifth embodiment of the invention. The description of cab 60 and instrument panel frame 1 given above with reference to FIGS. 1 to 6 can be transposed to cab 460 and instrument panel frame 401, which are similar thereto, with the noticeable exception of the hereafter stated difference(s).

An element of cab 460 or an element of instrument panel frame 401 that has a structure or function similar or corresponding to that of an element of cab 60 and an instrument panel frame 1 is allotted the same reference numeral plus 400. One can thus define supporting members 402 and 403, linking member 404, a control pedals unit 406, a steering column unit 407, fixing interfaces 408 and 409 plus a firewall structure 451.

Instrument panel frame 401 differs from instrument panel frame 1, because instrument panel frame 401 includes attaching arms 417, 418, 419 in lieu of the adjustable fasteners comprised of flanges 12 and 13.

The attaching arms 417, 418 are located between the linking member 404 and supporting member 402. The attaching arm 419 is located between the linking member 404 and supporting member 403. Each attaching arm 417, 418 or 419 is arranged to attach a respective supporting member 402 or 403 to the linking member 404. In the example of FIGS. 13 to 17, each attaching and 417, 418, 419 is integral with a respective supporting member 402 or 403.

Thus, the attaching arms 417, 418, 419 enhance the adaptability of the instrument panel frame design, because changing the form and length of these attaching arms 417, 418, 419 suffices to compensate for any change in the cab dimensions, while keeping the same fixing interfaces on the supporting members 402 and 403.

The attaching arms 417, 418, 419 are designed to slide along this profiled beam forming the linking member 404. Thus, the profiled linking member 404 and attaching arms 417, 418, 419 enable the adjustment of the distance between the supporting members 402 and 403.

Instrument panel frame 401 further differs from instrument panel frame 1, because the linking member 404 has a square cross-section, whereas the linking member 4 has a partly rectangular cross-section.

Furthermore, as illustrated on FIGS. 14 and 16, instrument panel frame 401 differs from instrument panel frame 1, because its rearwards offset distance D4.8 and upwards offset distance D4.9 are slightly different but still in the ranges 100 to 500 mm for D4.8 and in the range of 50 to 200 mm for D4.9.

Moreover, instrument panel frame 401 further differs from instrument panel frame 1, because supporting member 403 supports an electronic control unit (ECU) 420, visible on FIGS. 13 and 17, whereas supporting member 3 supports a heating, ventilating and air-conditioning unit (HVAC) 5.

FIGS. 18, 19, 20, 21 and 22 illustrate a method according to the invention for assembling the cab 60. This assembling method includes the steps of:

a) suspending onto a temporary structure 40 the supporting members 2 and 3 (FIG. 18); supporting members 2 and 3 are equipped with two subsets of the industrial vehicle 70, say a HVAC unit 5 and a control pedals unit 6; the temporary structure 40 herein is made of a carriage frame;

b) attaching the linking member 4 to the supporting members 2 and 3 (FIG. 19), so as to form instrument panel frame 1;

c) fastening components to instrument panel frame 1 (FIGS. 20 and 21), like dashboard components, dashboard panel 30, the subset of the steering column unit 7;

d) removing the instrument panel frame 1, equipped with said components, from the temporary structure 40;

e) arranging the supporting members 2 and 3 and the linking member so that each one of said fixing interface 8 and 9 cooperates with a respective fixing area 58 and 59 (FIG. 22); and f) fixing the instrument panel frame 1 to said firewall structure 51 of said body-in-white 50.

The assembling method enables to fully equip the front lower portion of cab 60 through quick and easy steps.

Of course, the invention is not restricted to the embodiments described above by way of non-limiting examples, but on the contrary the invention encompasses all embodiments thereof.

The invention claimed is:

1. Instrument panel frame for being fixed to a body-in-white of a cab of an industrial vehicle, the body-in-white including a firewall structure for defining a lower forward portion of the cab, the firewall structure having at least two major openings, the instrument panel frame including at least two supporting members and a linking member, each supporting member being suitable for supporting at least one subset of the industrial vehicle, wherein:

each supporting member is attached to the linking member;

each supporting member has a fixing interface designed to cooperate with a respective fixing area of the firewall structure, respective fixing area surrounding at least partly a respective one of major openings;

the supporting, members and the linking member are arranged so that each fixing interface cooperates with the respective fixing area, so as to enable the fixing of the instrument panel frame to the firewall structure, and the instrument panel frame includes adjustable fasteners for attaching each supporting member to the linking member with an adjustable distance between the supporting members.

2. The instrument panel frame according to claim 1, wherein each supporting member is suitable for supporting at least one subset of the industrial vehicle, the subsets of the industrial vehicle being preferably selected among a steering column unit, a control pedals unit, a heating, ventilating and air-conditioning unit, an electric control unit or an airbag unit.

3. The instrument panel frame according to claim 1, wherein each fixing interface is designed to totally surround a respective one of major openings, each fixing interface being preferably designed to fit on a periphery of a respective one of major openings.

4. The instrument panel frame according to claim 1, wherein the linking member includes a profiled beam, preferably having a hollow section, and wherein the adjustable fasteners are designed to slide along the profiled beam.

5. The instrument panel frame according to claim 1, wherein the linking member is designed to support at least one subset of the industrial vehicle.

6. The instrument panel frame according to claim 1, wherein the fixing interfaces have similar shapes so that the supporting members can be interchanged relative to the major openings.

7. The instrument panel frame according to claim 1, wherein each fixing interface has a rectangular shape.

8. The instrument panel frame according to claim 1, wherein the supporting members and the linking member are arranged so that the linking member is offset upwards from each supporting member when the instrument panel frame is fixed to the firewall structure.

9. The instrument panel frame according to claim 8, wherein the linking member has at least one lower edge and each supporting member has at least one upper edge, the supporting members and the linking member are arranged so that the lower edge of the linking member is offset upwards from the upper edge of each supporting member.

10. The instrument panel frame according to claim 9, wherein the upwards offset distance between the lower edge of the linking member and the upper edge of each supporting member lies in the range from 50 mm to 200 mm.

11. The instrument panel frame according to claim 1, wherein the supporting members and the linking member are arranged so that the linking member is offset rearwards from each fixing interface when the instrument panel frame is fixed to the firewall structure.

12. The instrument panel frame according to claim 11, wherein a rearwards offset distance between the linking member and each fixing interface lies in the range from 100 mm to 600 mm.

13. The instrument panel frame according to claim 1, wherein a wire harness extends along and inside the linking member.

14. The instrument panel frame according to claim 1, further including at least two attaching arms respectively located between the linking member and each supporting member, each attaching arm being arranged to attach a respective supporting member to the linking member, each attaching arm being integral either with a respective supporting member or with the linking member.

15. Cab for an industrial vehicle, comprising a body-in-white including a firewall structure for defining a lower forward portion of the cab, the firewall structure having at least two major openings, wherein the cab further includes an instrument panel frame for being fixed to the body-in-white of the cab, the instrument panel frame including at least two supporting members and a linking member, each supporting member being suitable for supporting at least one subset of the industrial vehicle, wherein:

each supporting member is attached to the linking member;

each supporting member has a fixing interface designed to cooperate with a respective fixing area of the firewall structure, respective fixing area surrounding at least partly a respective one of major openings;

the supporting members and the linking member are arranged so that each fixing interface cooperates with the respective fixing area, so as to enable the fixing of the instrument panel frame to the firewall structure, and the instrument panel frame includes adjustable fasteners for attaching each supporting member to the linking member with an adjustable distance between the supporting members, the instrument panel frame being fixed to the firewall structure.

16. The cab according to claim 15, wherein the supporting members and the linking member are arranged so that the linking member is offset from each supporting member according to a direction that extends from a floor towards an inside of the cab and that is substantially perpendicular to the floor of the cab.

17. The cab according to claim 16, wherein the offset distance between the linking member and each supporting member lies in the range from 50 mm to 200 mm according to the direction that that is substantially perpendicular to the floor of the cab.

18. The cab according to claim 15, wherein the supporting members and the linking member are arranged so that the linking member is offset from each fixing interface according to a direction that extends from the firewall structure towards the inside of the cab and that is substantially perpendicular to the firewall structure.

19. The cab according to claim 18, wherein an offset distance between the linking member and each fixing interface lies in the range from 100 mm to 600 mm according to the direction that is substantially perpendicular to the firewall structure.

20. Method for assembling a cab for an industrial vehicle, comprising a body-in-white including a firewall structure for defining a lower forward portion of the cab, the firewall structure having at least two major openings, wherein the cab further includes an instrument panel frame for being fixed to the body-in-white of the cab, the instrument panel frame including at least two supporting members and a linking member, each supporting member being suitable for supporting at least one subset of the industrial vehicle, wherein:

each supporting member is attached to the linking member;

each supporting member has a fixing interface designed to cooperate with a respective fixing area of the firewall structure, respective fixing area surrounding at least partly a respective one of major openings;

the supporting members and the linking member are arranged so that each fixing interface cooperates with the respective fixing area, so as to enable the fixing of the instrument panel frame to the firewall structure, and the instrument panel frame includes adjustable fasteners for attaching each supporting member to the linking member with an adjustable distance between the supporting members, the instrument panel frame being fixed to the firewall structure, the method including the steps of:

a) suspending onto a temporary structure at least two supporting members, preferably equipped with at least one subset of the industrial vehicle;

b) attaching the linking member to the supporting members so as to form instrument panel frame;

c) fastening components to the instrument panel frame, like dashboard components and dashboard panel;

d) removing the instrument panel frame, equipped with components, from the temporary structure;

e) arranging supporting members and the linking member so that each one of fixing interface cooperates with a respective fixing area; and f) fixing the instrument panel frame to firewall structure of body-in-white.

* * * * *